United States Patent
Rozman et al.

(10) Patent No.: US 10,486,836 B2
(45) Date of Patent: Nov. 26, 2019

(54) SOLAR POWERED SPACECRAFT POWER SYSTEM

(71) Applicant: Hamilton Sundstrand Corporation, Charlotte, NC (US)

(72) Inventors: Gregory I Rozman, Rockford, IL (US); Michael Anthony Futrell, Rockford, IL (US)

(73) Assignee: Hamilton Sundstrand Corporaration, Charlotte, NC (US)

( * ) Notice: Subject to any disclaimer, the term of this patent is extended or adjusted under 35 U.S.C. 154(b) by 492 days.

(21) Appl. No.: 15/348,379

(22) Filed: Nov. 10, 2016

(65) Prior Publication Data

US 2018/0127116 A1    May 10, 2018

(51) Int. Cl.
| | |
|---|---|
| *B64G 1/42* | (2006.01) |
| *B64G 1/44* | (2006.01) |
| *B64G 1/40* | (2006.01) |
| *H02J 7/35* | (2006.01) |
| *H02M 3/335* | (2006.01) |
| *H02J 7/34* | (2006.01) |

(52) U.S. Cl.
CPC ............... *B64G 1/428* (2013.01); *B64G 1/40* (2013.01); *B64G 1/425* (2013.01); *B64G 1/443* (2013.01); *H02J 7/35* (2013.01); *H02M 3/335* (2013.01); *H02J 7/345* (2013.01)

(58) Field of Classification Search
CPC .......... B64G 1/428; B64G 1/40; B64G 1/443; B64G 1/425; H02J 1/10; H02J 7/35; H02J 7/345; H02M 3/335; F03H 1/0018
See application file for complete search history.

(56) References Cited

U.S. PATENT DOCUMENTS

| | | | |
|---|---|---|---|
| 4,649,287 A | 3/1987 | Nola | |
| 5,228,644 A | 7/1993 | Garriott | |
| 5,311,419 A | 5/1994 | Shires | |
| 5,604,430 A | 2/1997 | Decker | |

(Continued)

FOREIGN PATENT DOCUMENTS

| | | |
|---|---|---|
| CN | 102324583 | 1/2012 |
| CN | 103414235 | 11/2013 |

(Continued)

OTHER PUBLICATIONS

European Patent Office, European Search Report dated Mar. 14, 2018 in Application No. 17196097.4-1202.

(Continued)

*Primary Examiner* — Rexford N Barnie
*Assistant Examiner* — Terrence R Willoughby
(74) *Attorney, Agent, or Firm* — Snell & Wilmer, L.L.P.

(57) ABSTRACT

An electrical power system may comprise a first energy source management converter (ESMC) configured to be connected in electronic communication with a first power source, a second ESMC configured to be connected in electronic communication with a second power source, and a multi-channel DC bus, wherein the first ESMC is configured to supply electric power to a first channel of the multi-channel DC bus, the second ESMC is configured to supply electric power to a second channel of the multi-channel DC bus, and the multi-channel DC bus is configured to supply electric power to a load.

15 Claims, 8 Drawing Sheets

(56) References Cited

U.S. PATENT DOCUMENTS

| | | | |
|---|---|---|---|
| 5,892,299 | A | 4/1999 | Siewert |
| 6,049,190 | A | 4/2000 | Canter |
| 6,344,700 | B1 | 2/2002 | Eisenhauer |
| 6,396,167 | B1* | 5/2002 | Simburger ............... H02J 7/35 307/150 |
| 7,150,938 | B2 | 12/2006 | Munshi |
| 7,492,057 | B2 | 2/2009 | Baldwin |
| 7,852,049 | B2 | 12/2010 | Maddali |
| 8,022,661 | B1 | 9/2011 | Bauer |
| 8,550,405 | B2 | 10/2013 | Hruby |
| 8,789,791 | B2 | 7/2014 | Matasso |
| 9,276,401 | B2 | 3/2016 | Rozman |
| 2003/0038610 | A1 | 2/2003 | Munshi et al. |
| 2009/0310391 | A1 | 12/2009 | Becker-Irvin |
| 2011/0073714 | A1 | 3/2011 | Hruby et al. |
| 2011/0299303 | A1 | 12/2011 | Lee |
| 2012/0232728 | A1 | 9/2012 | Karimi |
| 2012/0326516 | A1 | 12/2012 | Gurunathan |
| 2015/0288225 | A1* | 10/2015 | Dent ................ H02M 7/53871 307/66 |
| 2017/0366023 | A1* | 12/2017 | Tanaka ..................... H02J 7/35 |

FOREIGN PATENT DOCUMENTS

| | | |
|---|---|---|
| CN | 103414236 | 11/2013 |
| CN | 104300663 | 1/2015 |
| CN | 105429182 | 3/2016 |
| JP | H0530656 | 2/1993 |
| RU | 2411618 | 2/2011 |
| RU | 2430860 | 10/2011 |
| RU | 2476972 | 2/2013 |
| WO | 2012010613 | 1/2012 |

OTHER PUBLICATIONS

European Patent Office, European Search Report dated Jul. 16, 2018 in Application No. 18158950.8-1202.
Soeder J F et al: Overview and Evolution of the LERC PMAD DC Test BED11 , Aerospace Power. San Diego, Aug. 3-7, 1992; [Proceedings of the I Ntersoci Ety Energy Conversion Engineering Conference (IECEC)], New York, IEEE, US, vol. 6, Aug. 3, 1992 (Aug. 3, 1992), pp. 6.43-6.48.
Button RM et al: Stability Testing and Analysis of a PMAD DC Test Bed for the Space Station Freedom11 , Aerospace Power. San Diego, Aug. 3-7, 1992; [Proceedings of the I Ntersoci Ety Energy Conversion Engineering Conference (IECEC)], New York, IEEE, US, vol. 6, Aug. 3, 1992 (Aug. 3, 1992), pp. 6.93-6.98.
Brush A S et al: Development and Testing of a 180-Volt DC Electronic Circuit Breaker With 4 335-Ampere Carry and 1200-Ampere Interrupt Rating11 , Aerospace Power Systems Boston, Aug. 4-9, 1991; [Proceedings of the I Ntersoci Ety Energy Conversion Engineering Conference], New York, IEEE, US, vol. 2, Aug. 4, 1991 (Aug. 4, 1991), pp. 358-363.
USPTO, Notice of Allowance dated Jul. 26, 2018 in U.S. Appl. No. 15/348,413.
Extended European Search Report dated Dec. 7, 2017 in European Application No. 17196176.6.
Macie, et al., "Power processing requirements for solar electric propulsion," Proceedings of the Annual Power Electronics Specialists Conference (PESC), Blackburg, Jun. 22-26, 1987; Proceedings of the Annual Power Electronics Specialists Conference, (PESC), New York, IEEE, US, Apr. 19, 1971.
Rozman, et al., U.S. Appl. No. 15/348,413, filed Nov. 10, 2016 and entitled Electric Power System for a Space Vehicle.
Rozman, et al., U.S. Appl. No. 15/443,627, filed Feb. 27, 2017 and entitled Power Management and Distribution Architecture for a Space Vehicle.
English translation of Russian Patent No. 2574911, issued on Feb. 10, 2016 and owned by Information Satellite Systems (the patent cannot be located).
English translation of Russian Patent No. 2574475, issued on Feb. 10, 2016, assignee unknown (the patent cannot be located).
Gao, et al., "Parallehl-Connected Solar PV System to Address Partial and Rapidly Fluctuating Shadow Conditions," IEEE Trans. On Industrial Electronics, vol. 56, No. 5, pp. 1548-1556, May 2009.
Thomas, et al., "DroopControl Method for Parallel DC Converters Used in Standalone PV-Wind Power Generating System," International Journal of Research in Engineering and Technology, vol. 4, Issue 10, Oct. 2015.
European Patent Office, European Search Report dated Mar. 8, 2019 in Application No. 17196097.4.
European Patent Office, European Search Report dated Jan. 17, 2019 in Application No. 17196176.6.
USPTO, Notice of Allowance dated Sep. 18, 2018 in U.S. Appl. No. 15/348,413.
USPTO, Notice of Allowance dated Sep. 18, 2018 in U.S. Appl. No. 15/443,627.

* cited by examiner

SOLAR POWERED SPACECRAFT POWER SYSTEM

FIELD

The disclosure generally relates to electrical power systems, and more particularly to the design of an electrical power system for a space vehicle.

BACKGROUND

Space vehicles typically employ electrical power systems for powering various electronic and/or electro-mechanical devices onboard the space vehicle. Electrical storage capacity may be limited during space flight due to the remote nature of space travel. Solar arrays may be used to provide a renewable energy source for the electrical power system.

SUMMARY

In various embodiments, an electrical power system (EPS) is disclosed. An EPS may comprise a first energy source management converter (ESMC) configured to be connected in electronic communication with a first power source, a second energy source management converter (ESMC) configured to be connected in electronic communication with a second power source, and a multi-channel DC bus, wherein the first ESMC is configured to supply electric power to a first channel of the multi-channel DC bus, the second ESMC is configured to supply electric power to a second channel of the multi-channel DC bus, and the multi-channel DC bus is configured to supply electric power to a load.

In various embodiments, the first power source comprises at least one of a first solar array, a first battery, and a first supercapacitor, and the second power source comprises at least one of a second solar array, a second battery, and a second supercapacitor. The EPS may further comprise a power management system comprising a first DC/DC isolated converter configured to receive electric power from the first channel, and a second DC/DC isolated converter configured to receive electric power from the second channel. The EPS may further comprise a DC bus configured to receive electric power from the first DC/DC isolated converter. The DC bus may be configured to receive electric power from the second DC/DC isolated converter, the first DC/DC isolated converter and the second DC/DC isolated converter connected in series. The EPS may further comprise a power distribution unit (PDU) configured to receive electric power from the DC bus, wherein the multi-channel DC bus, the power management system, and the PDU are connected in series, and the DC bus is configured to supply electric power to the load via the PDU. The DC bus may comprise a high voltage direct current (HVDC) bus, the load comprising a high voltage load. The DC bus may comprise a low voltage direct current (LVDC) bus, the load comprising a low voltage load. The DC bus may comprise an unregulated DC bus, the DC bus configured to supply power to a thruster. The power management system may further comprise a third DC/DC isolated converter configured to receive electric power from a third channel of the multi-channel DC bus, a fourth DC/DC isolated converter configured to receive electric power from a fourth channel of the multi-channel DC bus, a fifth DC/DC isolated converter configured to receive electric power from a fifth channel of the multi-channel DC bus, and a sixth DC/DC isolated converter configured to receive electric power from a sixth channel of the multi-channel DC bus, wherein the first DC/DC isolated converter, the second DC/DC isolated converter, and the third DC/DC isolated converter are connected in series and comprise a first set of series-connected DC/DC isolated converters, the fourth DC/DC isolated converter, the fifth DC/DC isolated converter, and the sixth DC/DC isolated converter are connected in series and comprise a second set of series-connected DC/DC isolated converters, and the first set of series-connected DC/DC isolated converters and the second set of series-connected DC/DC isolated converters are connected in parallel and supply power to the DC bus. The EPS may further comprise a cascaded H-bridge inverter; and a power distribution unit (PDU), wherein the multi-channel DC bus, the cascaded H-bridge inverter, and the PDU are connected in series, the multi-channel DC bus configured to supply electric power to the load via the cascaded H-bridge inverter and the PDU, the load comprising an alternating current (AC) load.

In various embodiments, an EPS is disclosed. An EPS may comprise a first plurality of power sources comprising at least one of a first solar array, a first supercapacitor, and a first battery, a second plurality of power sources comprising at least one of a second solar array, a second supercapacitor, and a second battery, a first ESMC in electronic communication with the first plurality of power sources, a second ESMC in electronic communication with the second plurality of power sources, and a multi-channel DC bus, wherein the first ESMC supplies electric power to a first channel of a multi-channel direct current (DC) bus, the second ESMC supplies electric power to a second channel of the multi-channel DC bus, and the multi-channel DC bus supplies electric power to a load.

In various embodiments, the EPS may further comprise a power management system comprising a first DC/DC isolated converter configured to receive electric power from the first channel, and a second DC/DC isolated converter configured to receive electric power from the second channel. The EPS may further comprise a DC bus configured to receive electric power from the first DC/DC isolated converter and the second DC/DC isolated converter, wherein the first DC/DC isolated converter and the second DC/DC isolated converter are connected in series. The EPS may further comprise a PDU configured to receive electric power from the DC bus, wherein the multi-channel DC bus, the power management system, and the PDU are arranged in series, and the DC bus is configured to supply electric power to the load via the PDU. The DC bus may comprise a high voltage direct current (HVDC) bus, the load comprising a high voltage load. The DC bus may comprise a low voltage direct current (LVDC) bus, the load comprising a low voltage load. The DC bus may comprise an unregulated DC bus, the DC bus configured to supply power to a thruster. The EPS may further comprise a cascaded H-bridge inverter, and a PDU, wherein the multi-channel DC bus, the cascaded H-bridge inverter, and the PDU are connected in series, the multi-channel DC bus configured to supply electric power to the load via the cascaded H-bridge inverter and the PDU, the load comprising an alternating current (AC) load. The first ESMC may comprise an H-bridge coupled between the first solar array and the first channel.

In various embodiments, a method for supplying electric power to a load is disclosed. A method for supplying electric power to a load may comprise receiving, by a first channel of a multi-channel DC bus, electric power from a first plurality of electric power sources, via a first ESMC, and receiving, by a second channel of the multi-channel DC bus, electric power from a second plurality of electric power sources, via a second ESMC.

In various embodiments, the method may further comprise receiving, by a first DC/DC isolated converter, electric power from the first channel, receiving, by a second DC/DC isolated converter, electric power from the second channel, receiving, by a DC bus, electric power from the first DC/DC isolated converter, receiving, by the DC bus, electric power from the second DC/DC isolated converter, and receiving, by the load, electric power from the DC bus, wherein the first DC/DC isolated converter and the second DC/DC isolated converter are connected in series.

The foregoing features, elements, steps, or methods may be combined in various combinations without exclusivity, unless expressly indicated herein otherwise. These features, elements, steps, or methods as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

Figure 1:
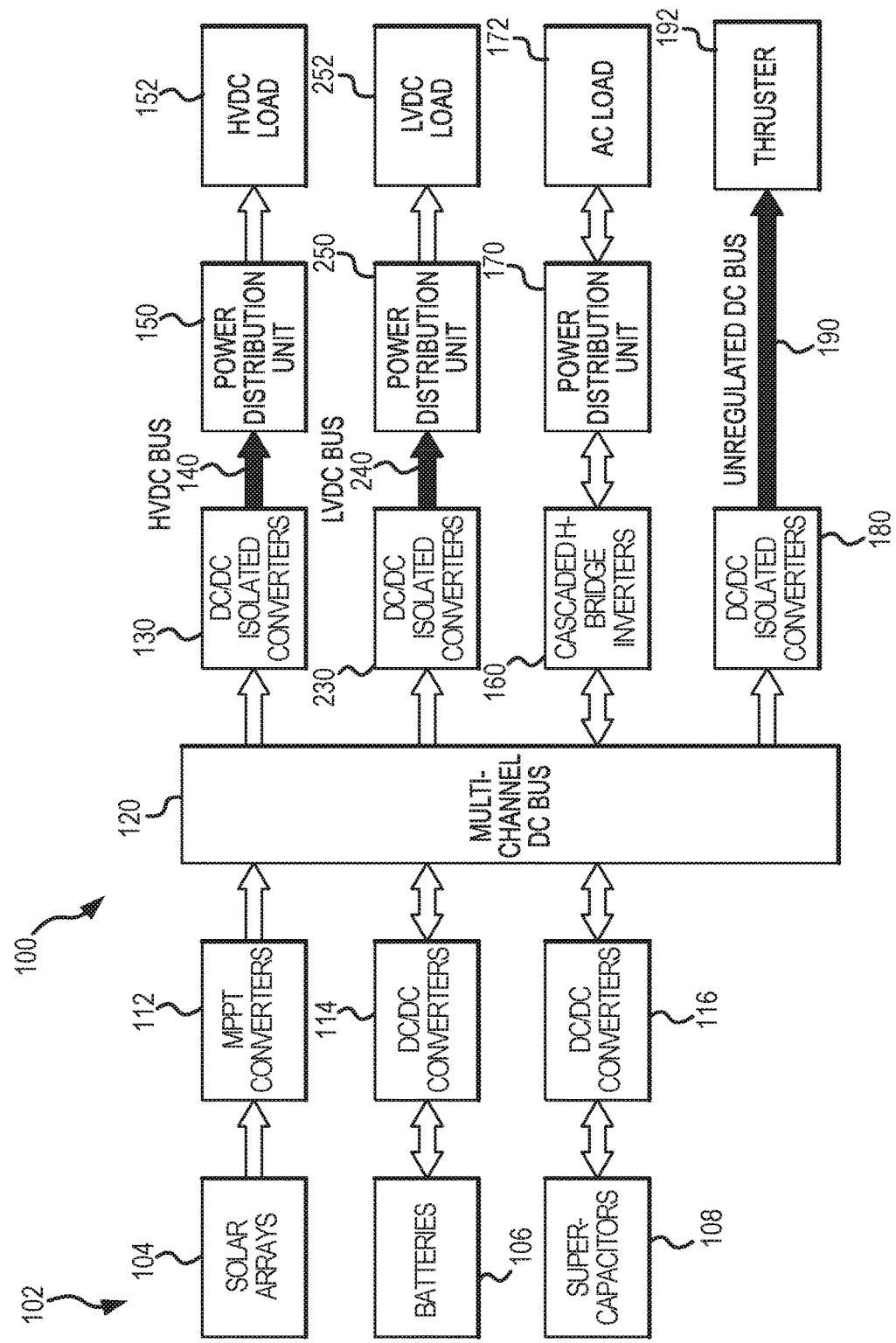
FIG. 1 illustrates a schematic view of an electrical power system (EPS), in accordance with various embodiments.

The detailed description of various embodiments herein makes reference to the accompanying drawings, which show various embodiments by way of illustration. While these various embodiments are described in sufficient detail to enable those skilled in the art to practice the inventions, it should be understood that other embodiments may be realized and that logical, chemical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

System program instructions and/or controller instructions may be loaded onto a non-transitory, tangible computer-readable medium having instructions stored thereon that, in response to execution by a controller, cause the controller to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

As used herein, "electronic communication" means communication of electronic signals with physical coupling (e.g., "electrical communication" or "electrically coupled") or without physical coupling and via an electromagnetic field (e.g., "inductive communication" or "inductively coupled" or "inductive coupling"). In that regard, use of the term "electronic communication" includes both "electrical communication" and "inductive communication."

As used herein, "connected" or "coupled" means "in electronic communication." As used herein, "direct electronic communication" means communication of electronic signals with no intermediary devices in the "electronic communication" other than a conduit for power, such as a wire.

In various embodiments, electrical power systems, as described herein, may provide redundancy in delivering electrical power to loads to maintain safe take-off, flight, and landing of a space vehicle. Electrical power systems, as described herein, may reduce electrical and thermal stresses on power electronics components during normal operation. Electrical power systems, as described herein, may support dynamic peak power typically associated with operation of actuators, such as rapid acceleration or regeneration, without oversizing the electrical power system. Electrical power systems, as described herein, may provide a significant reduction in electromagnetic induction (EMI) emissions, which may result in weight and size improvements of EMI filters.

With reference to FIG. 1, an electrical power system (EPS) 100 is illustrated, in accordance with various embodiments. EPS 100 may include power sources 102. Power sources 102 may include solar arrays 104, batteries 106, and/or supercapacitors 108. Solar arrays 104 may comprise a solar photovoltaic power system. Batteries 106 may comprise lithium-ion batteries. EPS 100 may include multi-channel DC bus 120. In various embodiments, multi-channel DC bus 120 may comprise an unregulated bus. Power sources 102 may supply power to multi-channel DC bus 120. Solar arrays 104 may supply power to multi-channel DC bus 120. Batteries 106 may supply power to multi-channel DC bus 120. In various embodiments, multi-channel DC bus 120 may supply power to batteries 106. Solar arrays 104 may supply power to batteries 106, via multi-channel DC bus 120, in response to batteries 106 having a charge which is less than a threshold value, for example. Supercapacitors 108 may supply power to multi-channel DC bus 120. In various embodiments, multi-channel DC bus 120 may supply power to supercapacitors 108. For example, solar arrays 104 may supply power to supercapacitors 108 via multi-channel DC bus 120.

In various embodiments, EPS 100 may include maximum power point tracking (MPPT) converters 112, DC/DC converters 114, and DC/DC converters 116. DC/DC converters 114 and DC/DC converters 116 may comprise bidirectional DC/DC converters. MPPT converters 112 may be coupled between solar arrays 104 and multi-channel DC bus 120. DC/DC converters 114 may be coupled between batteries 106 and multi-channel DC bus 120. DC/DC converters 116 may be coupled between supercapacitors 108 and multi-channel DC bus 120. In various embodiments, MPPT converters 112, DC/DC converters 114, and DC/DC converters 116 may connected in direct electronic communication with multi-channel DC bus 120.

In various embodiments, EPS 100 may include DC/DC converters 130 and a high voltage direct current (HVDC) bus 140. In various embodiments, HVDC bus 140 may comprise a regulated bus. Multi-channel DC bus 120 may supply power to HVDC bus 140. Multi-channel DC bus 120 may supply power to HVDC bus 140 via DC/DC converters 130. DC/DC converters 130 may be connected in series between multi-channel DC bus 120 and HVDC bus 140. In various embodiments, DC/DC converters 130 may be connected, in direct electronic communication, in series between multi-channel DC bus 120 and HVDC bus 140. DC/DC converters 130 may be galvanically isolated.

In various embodiments, multi-channel DC bus 120 may supply power to a low voltage direct current (LVDC) bus 240. In various embodiments, LVDC bus 240 may comprise a regulated bus. Multi-channel DC bus 120 may supply power to LVDC bus 240 via DC/DC converters 230. DC/DC converters 230 may be connected in series between multi-channel DC bus 120 and LVDC bus 240. DC/DC converters 230 may be galvanically isolated. In various embodiments, DC/DC converters 230 may be connected, in electronic communication, in series between multi-channel DC bus 120 and LVDC bus 240. In various embodiments, DC/DC converters 230 may be connected, in direct electronic communication, in series between multi-channel DC bus 120 and LVDC bus 240.

In various embodiments, EPS 100 may include power distribution unit (PDU) 150. In various embodiments, PDU 150 may be connected, in direct electronic communication, with HVDC bus 140. PDU 150 may distribute electric power from HVDC bus 140 to HVDC load 152. PDU 150 may comprise solid state power controller (SSPCs), electric fuses, or circuit breakers. In various embodiments, EPS 100 may include PDU 250. In various embodiments, PDU 250 may be connected, in electronic communication, with LVDC bus 240. In various embodiments, PDU 250 may be connected, in direct electronic communication, with LVDC bus 240. PDU 250 may distribute electric power from LVDC bus 240 to LVDC loads 252.

In various embodiments, EPS 100 may include a PDU 170. Multi-channel DC bus 120 may supply power to PDU 170. PDU 170 may direct said power to alternating current (AC) load 172. In various embodiments, AC load 172 may comprise actuators, motors, lights, or any other electronic device configured to receive AC power. Multi-channel DC bus 120 may supply power to PDU 170 via cascaded H-bridge inverters 160. In this regard, cascaded H-bridge inverters 160 may be coupled in series between multi-channel DC bus 120 and PDU 170. In various embodiments, cascaded H-bridge inverters 160 may be coupled, in direct electronic communication, in series between multi-channel DC bus 120 and PDU 170.

In various embodiments, EPS 100 may include an unregulated DC bus 190. Multi-channel DC bus 120 may supply power to unregulated DC bus 190. Multi-channel DC bus 120 may supply power to unregulated DC bus 190 via DC/DC converters 180. In this regard, DC/DC converters 180 may be coupled in series between multi-channel DC bus 120 and unregulated DC bus 190. Unregulated DC bus 190 may supply power to a thruster 192. DC/DC converters 180 may be galvanically isolated.

With respect to FIGS. 2, 3A, 3B, 3C, 4, and 5, elements with like element numbering, as depicted in FIG. 1, are intended to be the same and will not necessarily be repeated for the sake of clarity.

Figure 2:
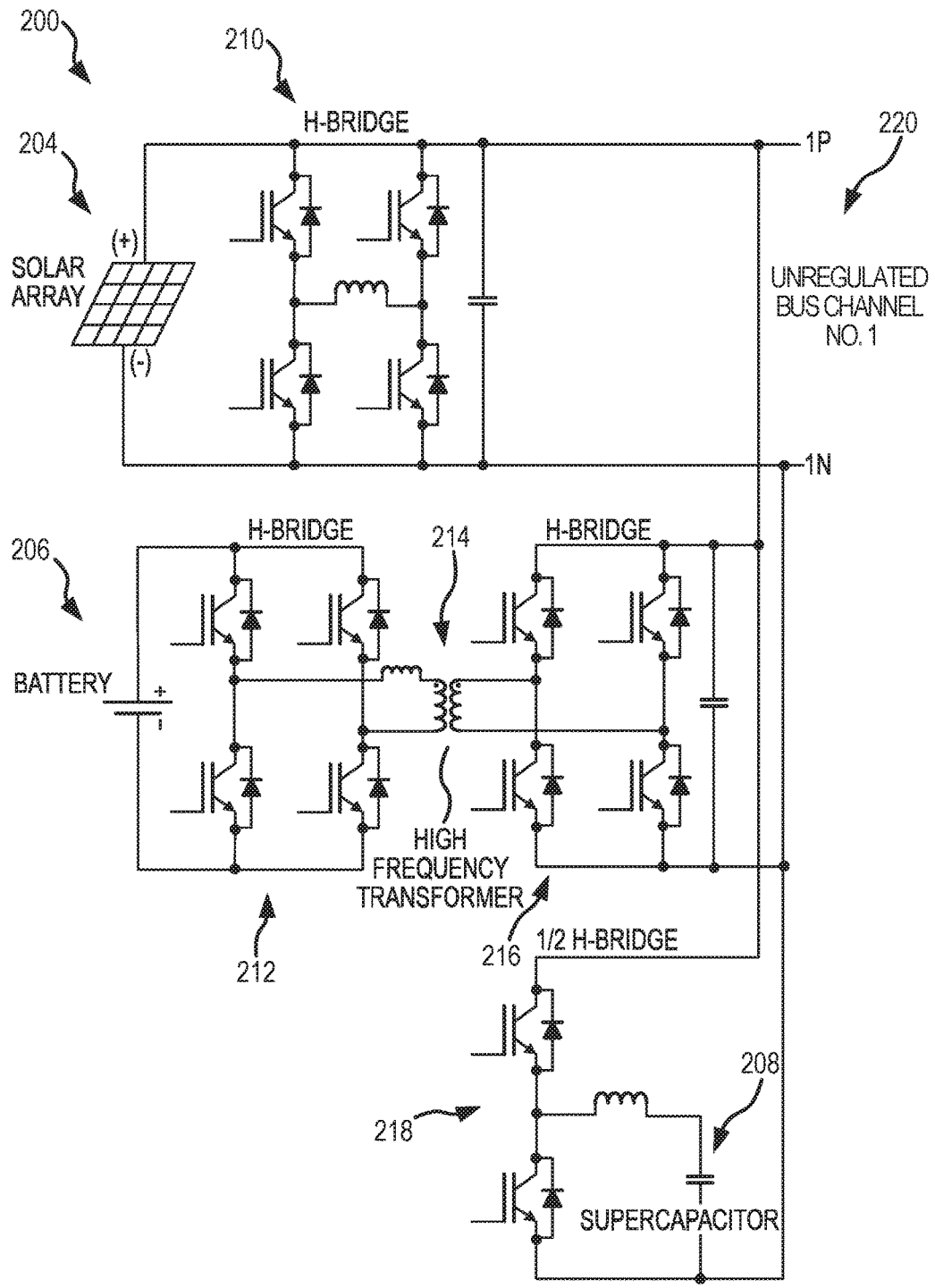
FIG. 2 illustrates a schematic view of an energy source management converter (ESMC), in accordance with various embodiments.

With reference to FIG. 2, an energy source management converter (ESMC) 200 is illustrated, in accordance with various embodiments. ESMC 200 may include H-bridge 210. In various embodiments, H-bridge 210 may regulate electric power supplied to first channel 220 from solar array 204. In various embodiments, MPPT converters 112 may include H-bridge 210, with momentary reference to FIG. 1.

ESMC 200 may include H-bridge 212, high frequency transformer 214, and H-bridge 216. In various embodiments, H-bridge 212 may be in electronic communication with H-bridge 216, via high frequency transformer 214. In various embodiments, H-bridge 212, high frequency transformer 214, and H-bridge 216 may regulate electric power supplied to first channel 220 from battery 206. In various embodiments, DC/DC converters 114 may include H-bridge 212, high frequency transformer 214, and H-bridge 216, with momentary reference to FIG. 1.

ESMC 200 may include half H-bridge 218. Supercapacitor 208 may supply electric power to first channel 220 via half H-bridge 218. In various embodiments, DC/DC converters 116 may include half H-bridge 218, with momentary reference to FIG. 1. In various embodiments, multi-channel DC bus 120 may include first channel 220.

Figure 3A:
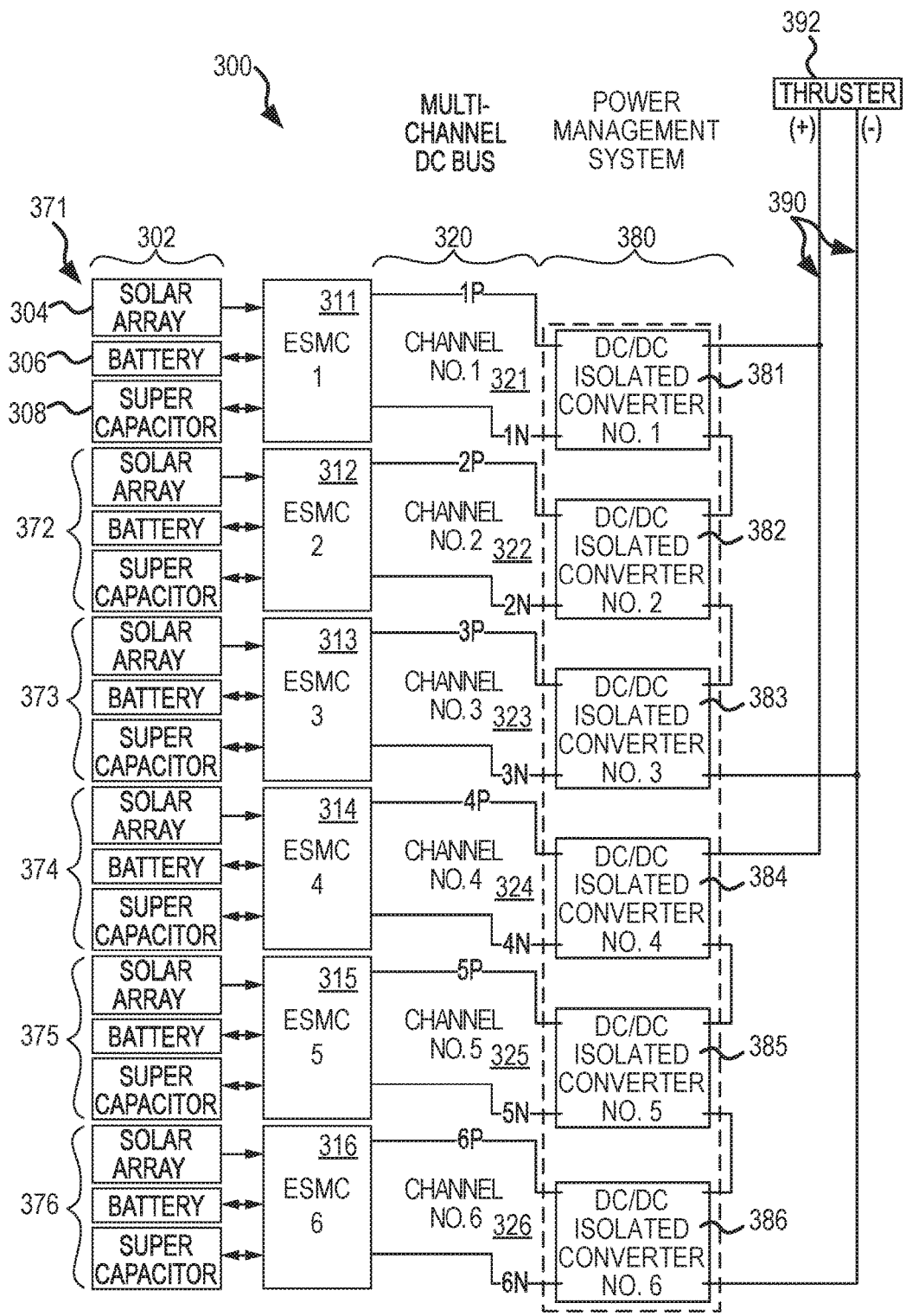
FIG. 3A illustrates a schematic view of an EPS having a multi-channel direct current (DC) bus and a power management system for a thruster in electronic communication with the channels of the multi-channel DC bus, in accordance with various embodiments.

With reference to FIG. 3A, an electrical power system (EPS) 300 is illustrated, in accordance with various embodiments. In various embodiments, EPS 100 may be similar to EPS 300, with momentary reference to FIG. 1. EPS 300 may include power sources 302. Power sources 302 may be similar to power sources 102, with momentary reference to FIG. 1. Power sources 302 may include a first plurality of power sources 371 comprising solar array (also referred to herein as a first solar array) 304, battery (also referred to herein as a first battery) 306, and supercapacitor (also referred to herein as a first supercapacitor) 308. Power sources 302 may include a second plurality of power sources 372. Second plurality of power sources 372 may be similar to first plurality of power sources 371. Likewise, power sources 302 may include a third plurality of power sources 373, a fourth plurality of power sources 374, a fifth plurality of power sources 375, and a sixth plurality of power sources 376.

In various embodiments, EPS 300 may include a plurality of ESMCs, including first ESMC 311, second ESMC 312, third ESMC 313, fourth ESMC 314, fifth ESMC 315, and sixth ESMC 316. First plurality of power sources 371 may supply electric power to first ESMC 311. In this regard, first plurality of power sources 371 may be in electronic communication with first ESMC 311. First ESMC 311 may be similar to ESMC 200, with momentary reference to FIG. 2. Second plurality of power sources 372 may supply electric power to second ESMC 312. Likewise, third plurality of power sources 373, fourth plurality of power sources 374, fifth plurality of power sources 375, and sixth plurality of power sources 376 may supply electric power to third ESMC 313, fourth ESMC 314, fifth ESMC 315, and sixth ESMC 316, respectively.

In various embodiments, EPS 300 may include a multi-channel DC bus 320. Multi-channel DC bus 320 may be similar to multi-channel DC bus 120, with momentary reference to FIG. 1. Multi-channel DC bus 320 may comprise a plurality of channels comprising positive terminals and negative terminals associated with an ESMC. In this regard, multi-channel DC bus 320 may comprise a first channel 321 comprising positive terminal 1P and a negative terminal 1N associated with first ESMC 311, whereby multi-channel DC bus 320 receives electric power from first ESMC 311. Similarly, multi-channel DC bus 320 may comprise a second channel 322 comprising a positive terminal 2P and a negative terminal 2N associated with second ESMC 312, whereby multi-channel DC bus 320 receives electric power from second ESMC 312. Likewise, multi-channel DC bus 320 may comprise a third channel 323 comprising a positive terminal 3P and a negative terminal 3N, a fourth channel 324 comprising a positive terminal 4P and a negative terminal 4N, a fifth channel 325 comprising a positive terminal 5P and a negative terminal 5N, and a sixth channel 326 comprising a positive terminal 6P and a negative terminal 6N associated with third ESMC 313, fourth ESMC 314, fifth ESMC 315, and sixth ESMC 316, respectively.

Figure 3B:
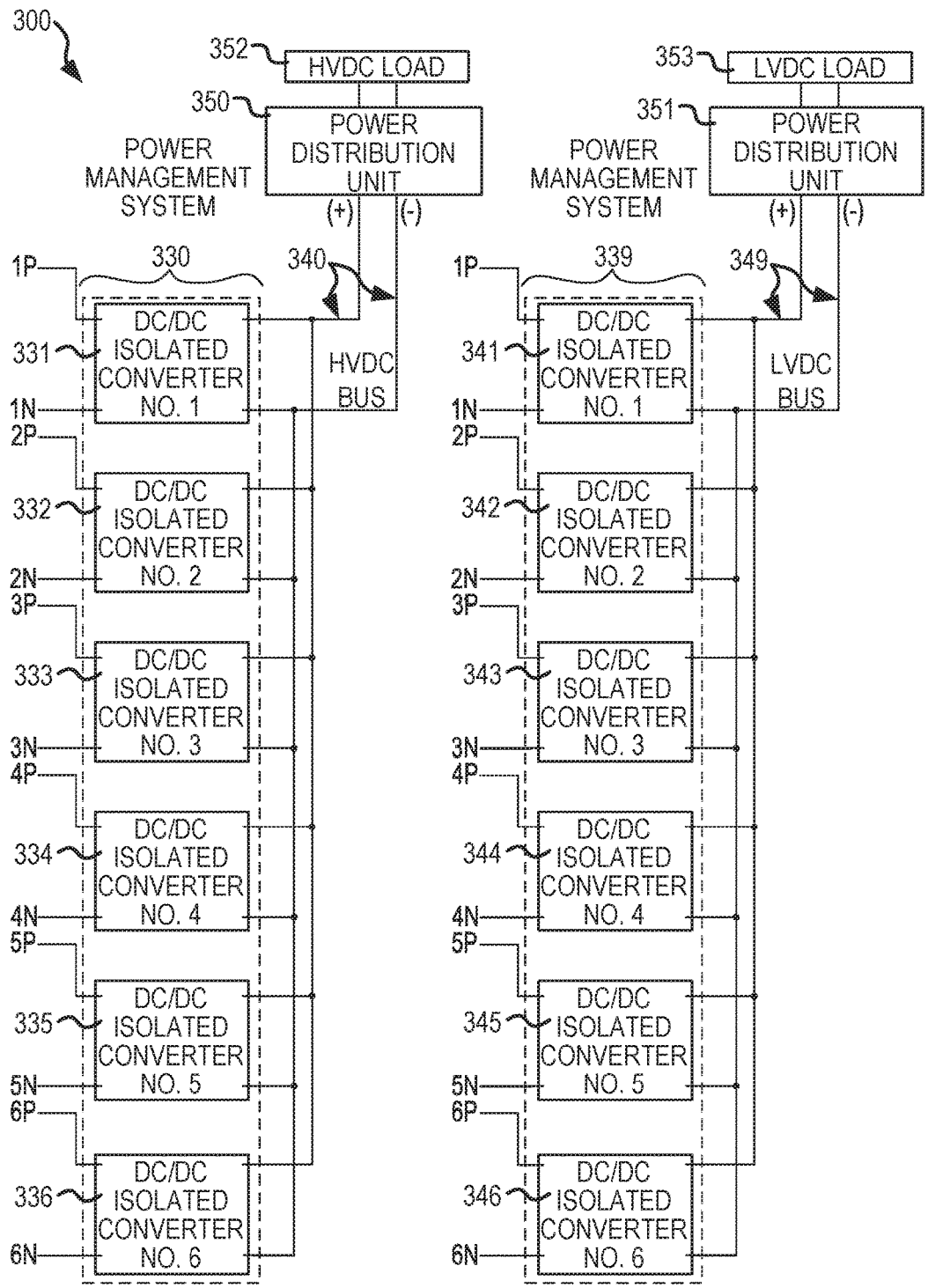
FIG. 3B illustrates a schematic view of power management systems for a high voltage DC load and for a low voltage DC load in electronic communication with the channels of the multi-channel DC bus of FIG. 3A, in accordance with various embodiments.
Figure 3C:
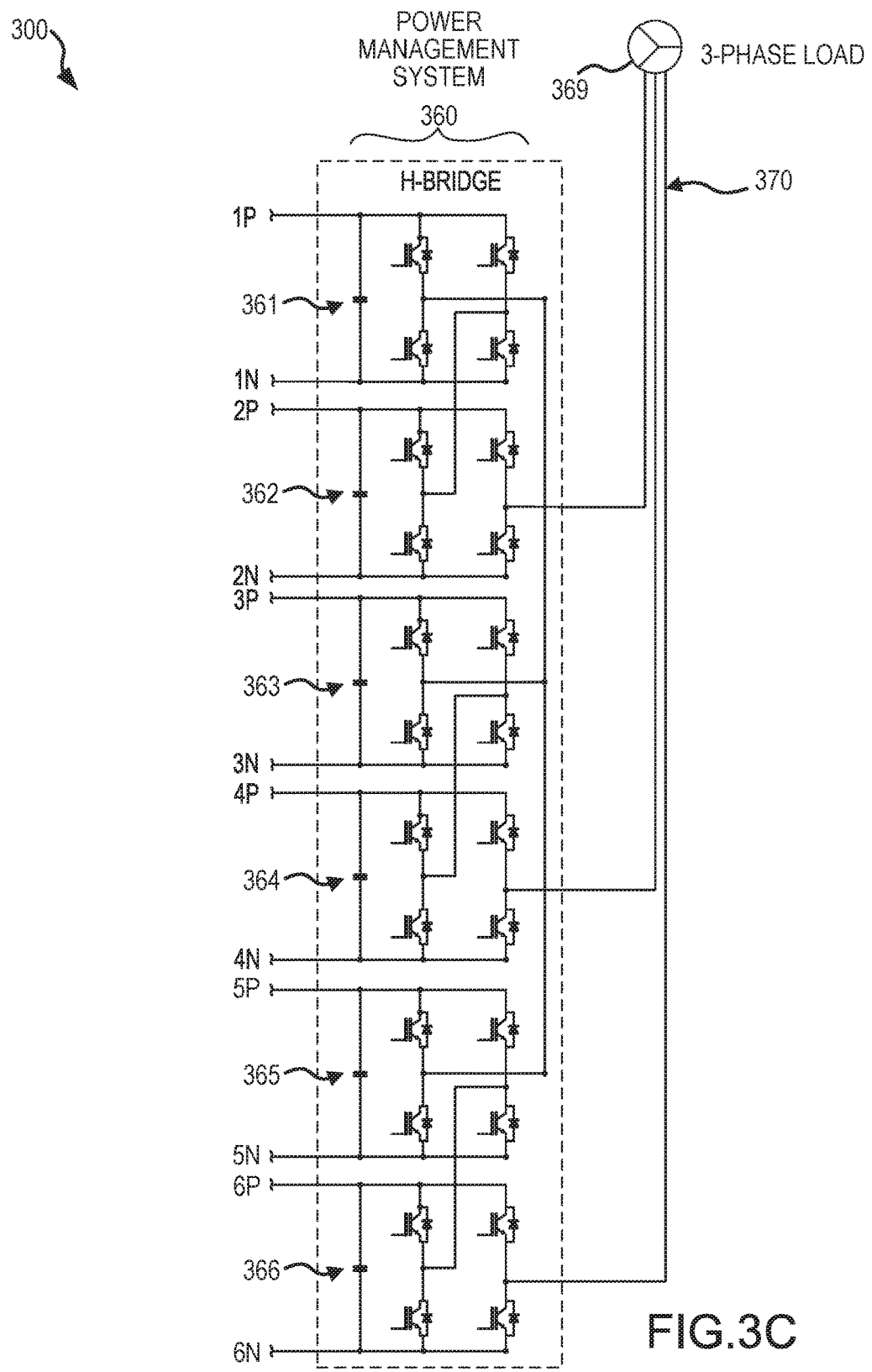
FIG. 3C illustrates a schematic view of power management systems for a three-phase load in electronic communication with the channels of the multi-channel DC bus of FIG. 3A, in accordance with various embodiments.

In various embodiments, various loads may be coupled to multi-channel DC bus 320 via various power management systems, as illustrated in FIGS. 3A, 3B, and 3C.

With continued reference to FIG. 3A, EPS 300 may include a power management system 380. Power management system 380 may comprise a power management system for a propulsor, such as a thruster for example. Power management system 380 may be in electronic communication with multi-channel DC bus 320. Power management system 380 may include first DC/DC isolated converter 381, second DC/DC isolated converter 382, third DC/DC isolated converter 383, fourth DC/DC isolated converter 384, fifth DC/DC isolated converter 385, and sixth DC/DC isolated converter 386. Power management system 380 may comprise a first set of series-connected DC/DC isolated converters comprising first DC/DC isolated converter 381, second DC/DC isolated converter 382, and third DC/DC isolated converter 383 connected in series. Power management system 380 may comprise a second set of series-connected DC/DC isolated converters comprising fourth DC/DC isolated converter 384, fifth DC/DC isolated converter 385, and sixth DC/DC isolated converter 386 connected in series. Said first set may be connected in parallel with said second set. First DC/DC isolated converter 381 may be in electronic communication with the first channel 321 of multi-channel DC bus 320. In this regard, first DC/DC isolated converter 381 may receive electric power from the first channel 321. Second DC/DC isolated converter 382 may be in electronic communication with the second channel 322 of multi-channel DC bus 320. In this regard, second DC/DC isolated converter 382 may receive electric power from the second channel 322. In various embodiments, power management system 380 may be similar to DC/DC converters 180, with momentary reference to FIG. 1.

EPS 300 may include unregulated DC bus 390. Unregulated DC bus 390 may receive electric power from power management system 380. The electric power may comprise a voltage defined by the sum of the individual voltages of first DC/DC isolated converter 381, second DC/DC isolated converter 382, and third DC/DC isolated converter 383. The electric power may comprise a voltage defined by the sum of the individual voltages of fourth DC/DC isolated converter 384, fifth DC/DC isolated converter 385, and sixth DC/DC isolated converter 386. In this regard, the two sets of series-connected DC/DC converters (i.e., DC/DC converters 381, 382, 383 and 384, 385, 386, respectively) may be connected in parallel to supply power to unregulated DC bus 390. Unregulated DC bus 390 may be in electronic communication with a thruster 392. In this regard, thruster 392 may receive electric power from power management system 380. In various embodiments, unregulated DC bus 390 may be similar to unregulated DC bus 190, with momentary reference to FIG. 1.

With combined reference to FIG. 3A and FIG. 3B, EPS 300 may include a power management system 330. Power management system 330 may comprise a power management system for an HVDC load, such as an actuator motor controller for example. Power management system 330 may be in electronic communication with multi-channel DC bus 320. Power management system 330 may include first DC/DC isolated converter 331, second DC/DC isolated converter 332, third DC/DC isolated converter 333, fourth DC/DC isolated converter 334, fifth DC/DC isolated converter 335, and sixth DC/DC isolated converter 336. First DC/DC isolated converter 331, second DC/DC isolated converter 332, third DC/DC isolated converter 333, fourth DC/DC isolated converter 334, fifth DC/DC isolated converter 335, and sixth DC/DC isolated converter 336 may be connected in series. First DC/DC isolated converter 331 may be in electronic communication with the first channel 321 of multi-channel DC bus 320. In this regard, first DC/DC isolated converter 331 may receive electric power from the first channel 321. Second DC/DC isolated converter 332 may be in electronic communication with the second channel 322 of multi-channel DC bus 320. In this regard, second DC/DC isolated converter 332 may receive electric power from the second channel 322. In various embodiments, power management system 330 may be similar to DC/DC converters 130, with momentary reference to FIG. 1.

EPS 300 may include HVDC bus 340. HVDC bus 340 may receive electric power from power management system 330. The electric power may comprise a current defined by the sum of the individual currents of first DC/DC isolated converter 331, second DC/DC isolated converter 332, third DC/DC isolated converter 333, fourth DC/DC isolated converter 334, fifth DC/DC isolated converter 335, and sixth DC/DC isolated converter 336. HVDC bus 340 may be in electronic communication with an HVDC load 352. In this regard, HVDC load 352 may receive electric power from power management system 330. In various embodiments, HVDC bus 340 may be similar to HVDC bus 140, with momentary reference to FIG. 1. PDU 350 may be coupled between power management system 330 and HVDC load 352. PDU 350 may be similar to PDU 150, with momentary reference to FIG. 1.

With combined reference to FIG. 3A and FIG. 3B, EPS 300 may include a power management system 339. Power management system 339 may comprise a power management system for an LVDC load, such as a light source for example. Power management system 339 may be in electronic communication with multi-channel DC bus 320. Power management system 339 may include first DC/DC isolated converter 341, second DC/DC isolated converter 342, third DC/DC isolated converter 343, fourth DC/DC isolated converter 344, fifth DC/DC isolated converter 345, and sixth DC/DC isolated converter 346. First DC/DC isolated converter 341, second DC/DC isolated converter 342, third DC/DC isolated converter 343, fourth DC/DC isolated converter 344, fifth DC/DC isolated converter 345, and sixth DC/DC isolated converter 346 may be connected in series. First DC/DC isolated converter 341 may be in electronic communication with the first channel 321 of multi-channel DC bus 320. In this regard, first DC/DC isolated converter 341 may receive electric power from the first channel 321. Second DC/DC isolated converter 342 may be in electronic communication with the second channel 322 of multi-channel DC bus 320. In this regard, second DC/DC isolated converter 342 may receive electric power from the second channel 322. In various embodiments, power management system 339 may be similar to DC/DC converters 230, with momentary reference to FIG. 1.

EPS 300 may include LVDC bus 349. LVDC bus 349 may receive electric power from power management system 339. Said electric power may comprise a current defined by the sum of the individual currents of first DC/DC isolated converter 341, second DC/DC isolated converter 342, third DC/DC isolated converter 343, fourth DC/DC isolated converter 344, fifth DC/DC isolated converter 345, and sixth DC/DC isolated converter 346. LVDC bus 349 may be in electronic communication with an LVDC load 353. In this regard, LVDC load 353 may receive electric power from power management system 339. In various embodiments, LVDC bus 349 may be similar to LVDC bus 240, with momentary reference to FIG. 1. PDU 351 may be coupled between power management system 339 and LVDC load 353. PDU 351 may be similar to PDU 250, with momentary reference to FIG. 1.

With combined reference to FIG. 3A and FIG. 3C, EPS 300 may include a power management system 360. Power management system 360 may comprise a power management system for an AC load, such as a motor for example. Power management system 360 may comprise a three-phase, five-level motor drive. Power management system 360 may be in electronic communication with multi-channel DC bus 320. Power management system 360 may include first H-bridge 361, second H-bridge 362, third H-bridge 363, fourth H-bridge 364, fifth H-bridge 365, and sixth H-bridge 366. First H-bridge 361 may be in electronic communication with the first channel 321 of multi-channel DC bus 320. In this regard, first H-bridge 361 may receive electric power from the first channel 321. Second H-bridge 362 may be in electronic communication with the second channel 322 of multi-channel DC bus 320. In this regard, second H-bridge 362 may receive electric power from the second channel 322. In various embodiments, power management system 360 may be similar to cascaded H-bridge inverters 160, with momentary reference to FIG. 1.

EPS 300 may include three-phase bus 370. Three-phase bus 370 may receive electric power from power management system 360. Power management system 360 may comprise a three-phase, five-level inverter. Power management system 360 may comprise a multi-level motor drive. Three-phase bus 370 may be in electronic communication with a three-phase load 369. In this regard, three-phase load 369 may receive electric power from power management system 360. In various embodiments, three-phase bus 370 may be coupled between power management system 360 and three-phase load 369. In various embodiments, Three-phase bus 370 may include PDU 170, with momentary reference to FIG. 1.

In various embodiments, a plurality of power management systems 360 may be connected in parallel to multi-channel DC bus 320. Each of the power management systems 360 may be connected to a separate three-phase load 369 or to a similar three-phase load 369.

Figure 4:
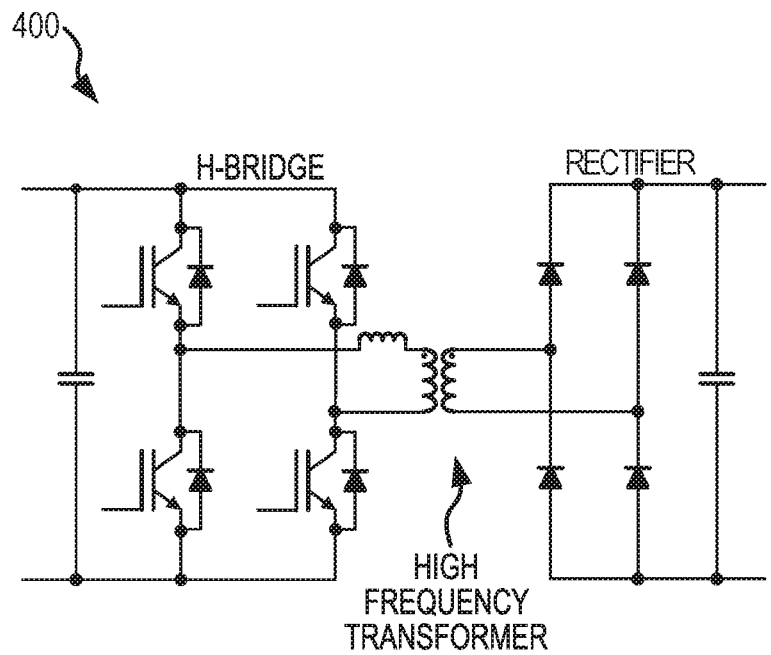
FIG. 4 illustrates a schematic view of a DC/DC converter, in accordance with various embodiments.

With reference to FIG. 4, a DC/DC isolated converter 400 is illustrated, in accordance with various embodiments. With additional reference to FIG. 3A and FIG. 3B, DC/DC isolated converter 381, DC/DC isolated converter 331, and/or DC/DC isolated converter 341 may be similar to the topology of DC/DC isolated converter 400.

Figure 5:
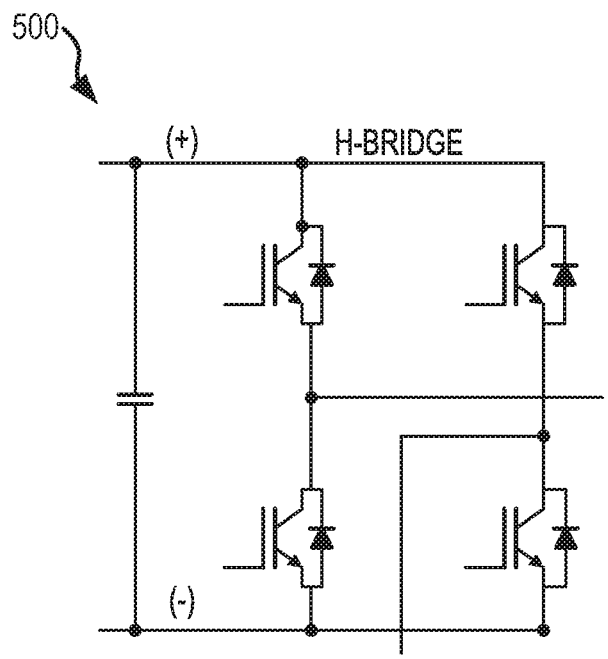
FIG. 5 illustrates a schematic view of an H-bridge inverter, in accordance with various embodiments.

With reference to FIG. 5, an H-bridge 500 is illustrated, in accordance with various embodiments. With additional reference to FIG. 3C, H-bridge 361 may be similar to the topology of H-bridge 500.

Figure 6:
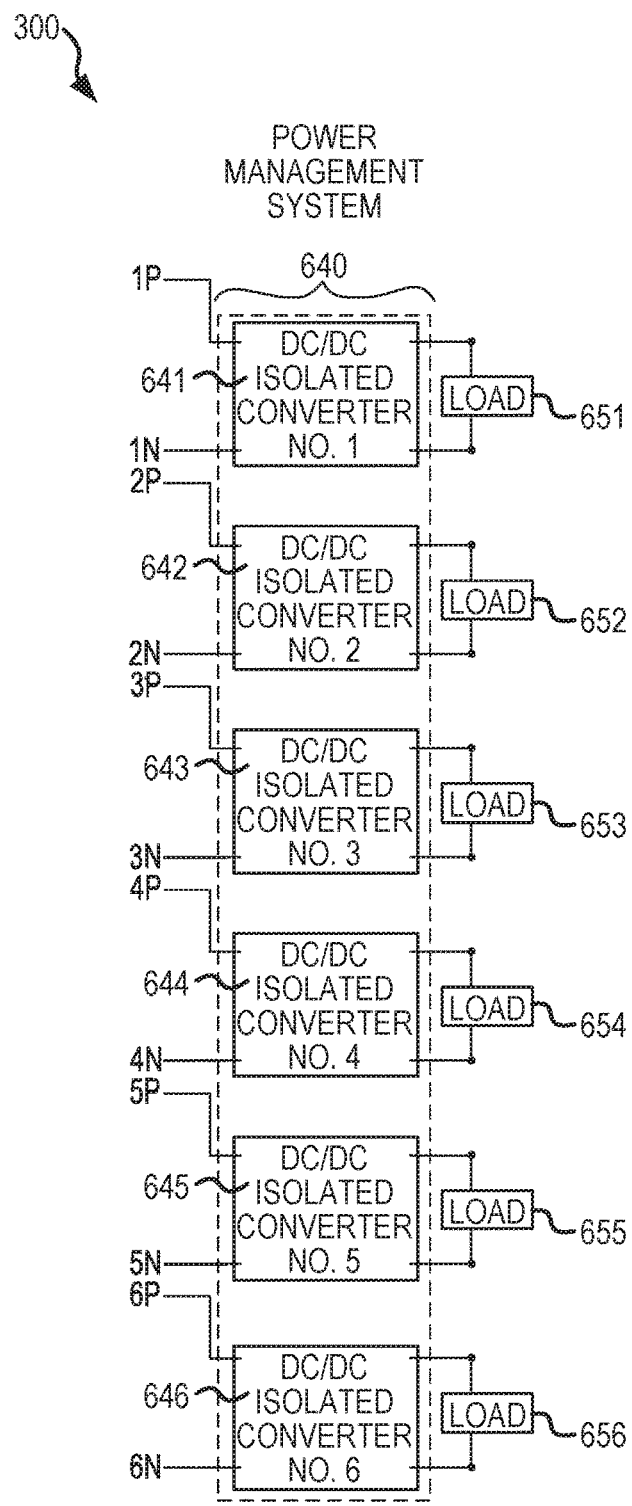
FIG. 6 illustrates a schematic view of a power management system for a plurality of DC loads in electronic communication with the channels of the multi-channel DC bus of FIG. 3A, in accordance with various embodiments.

With combined reference to FIG. 3A and FIG. 6, EPS 300 may comprise power management system 640, in accordance with various embodiments. Power management system 640 may comprise a power management system for an LVDC load, such as a light source for example. Power management system 640 may comprise a power management system for an HVDC load, such as an actuator motor controller for example. Power management system 640 may be in electronic communication with multi-channel DC bus 320. Power management system 640 may include first DC/DC isolated converter 641, second DC/DC isolated converter 642, third DC/DC isolated converter 643, fourth DC/DC isolated converter 644, fifth DC/DC isolated converter 645, and sixth DC/DC isolated converter 646. First DC/DC isolated converter 641 may be in electronic communication with the first channel 321 of multi-channel DC bus 320. In this regard, first DC/DC isolated converter 641 may receive electric power from the first channel 321. Second DC/DC isolated converter 642 may be in electronic communication with the second channel 322 of multi-channel DC bus 320. In this regard, second DC/DC isolated converter 642 may receive electric power from the second channel 322.

In various embodiments, first DC/DC isolated converter 641 may supply power to a first load 651 connected across first DC/DC isolated converter 641. Second DC/DC isolated converter 642 may supply power to a second load 652 connected across second DC/DC isolated converter 642.

Third DC/DC isolated converter 643 may supply power to a third load 653 connected across third DC/DC isolated converter 643. Fourth DC/DC isolated converter 644 may supply power to a fourth load 654 connected across fourth DC/DC isolated converter 644. Fifth DC/DC isolated converter 645 may supply power to a fifth load 655 connected across fifth DC/DC isolated converter 645. Sixth DC/DC isolated converter 646 may supply power to a sixth load 656 connected across sixth DC/DC isolated converter 646.

Figure 7:
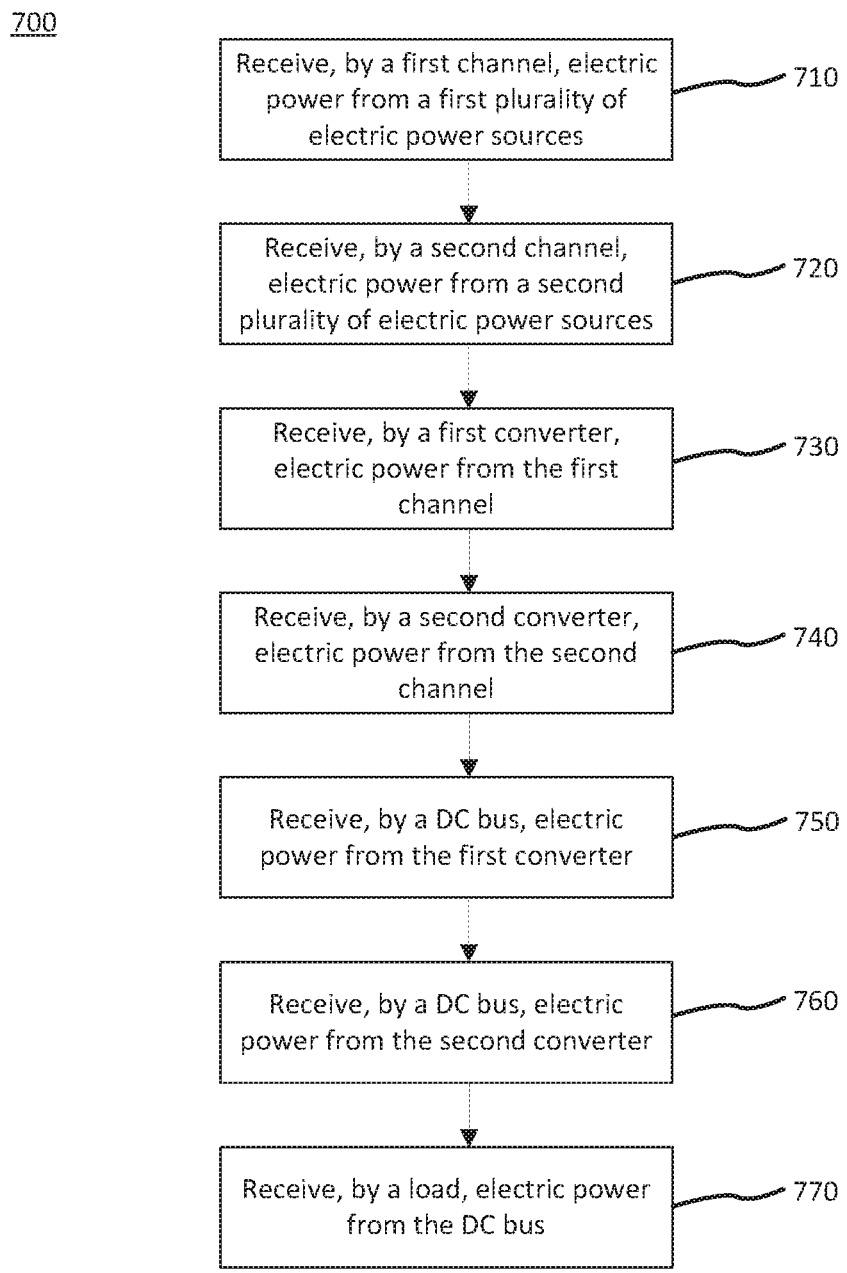
FIG. 7 illustrates a method for supplying electric power to a load, in accordance with various embodiments.

With reference to FIG. 7, a method 700 for supplying electric power to a load is illustrated, in accordance with various embodiments. Method 700 includes receiving, by a first channel, electric power from a first plurality of electric power sources (step 710). Method 700 includes receiving by a second channel, electric power from a second plurality of electric power sources (step 720). Method 700 includes receiving, by a first converter, electric power from the first channel (step 730). Method 700 includes receiving, by a second converter, electric power from the second channel (step 740). Method 700 includes receiving, by a DC bus, electric power from the first converter (step 750). Method 700 includes receiving, by a DC bus, electric power from the second converter (step 760). Method 700 includes receiving, by a load, electric power from the DC bus (step 770).

With combined reference to FIG. 1, FIG. 3A, FIG. 3B, and FIG. 7, step 710 may include receiving, by first channel 321 of multi-channel direct current (DC) bus 320, electric power from a first plurality of power sources 371, via first ESMC 311. Step 720 may include receiving, by second channel 322 of multi-channel DC bus 320, electric power from second plurality of power sources 372, via second ESMC 312. Step 730 may include receiving, by first DC/DC isolated converter 381, electric power from first channel 321. Step 740 may include receiving, by second DC/DC isolated converter 382, electric power from second channel 322. But step 730 and step 740 may include receiving electric power from first channel 321 by first H-bridge 361 and receiving electric power from second channel 322 by second H-bridge 362, respectively, with momentary reference to FIG. 3C. Step 750 may include receiving, by a DC bus (i.e., HVDC bus 140, LVDC bus 240, and/or unregulated DC bus 190), electric power from the first DC/DC isolated converter (i.e., first DC/DC isolated converter 381, first DC/DC isolated converter 331, and/or first DC/DC isolated converter 341). Step 760 may include receiving, by the DC bus, electric power from the second DC/DC isolated converter (i.e., second DC/DC isolated converter 382, second DC/DC isolated converter 332, and/or second DC/DC isolated converter 342). Step 770 may include receiving, by a load (i.e., thruster 392, HVDC load 352, and/or LVDC load 353) electric power from the DC bus.

Benefits, other advantages, and solutions to problems have been described herein with regard to specific embodiments. Furthermore, the connecting lines shown in the various figures contained herein are intended to represent various functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An electrical power system comprising:
   a first energy source management converter (ESMC) configured to be connected in electronic communication with a first power source;
   a second energy source management converter (ESMC) configured to be connected in electronic communication with a second power source;
   a multi-channel DC bus configured supply electric power to a load;
   a DC bus; and
   a power management system;
   wherein the first ESMC is configured to supply electric power to a first channel of the multi-channel DC bus, the second ESMC is configured to supply electric power to a second channel of the multi-channel DC bus;
   the power management system comprises:
      a first DC/DC isolated converter configured to receive electric power from the first channel;
      a second DC/DC isolated converter configured to receive electric power from the second channel;
      a third DC/DC isolated converter configured to receive electric power from a third channel of the multi-channel DC bus;
      a fourth DC/DC isolated converter configured to receive electric power from a fourth channel of the multi-channel DC bus;
      a fifth DC/DC isolated converter configured to receive electric power from a fifth channel of the multi-channel DC bus; and
      a sixth DC/DC isolated converter configured to receive electric power from a sixth channel of the multi-channel DC bus,
   wherein the first DC/DC isolated converter, the second DC/DC isolated converter, and the third DC/DC isolated converter are connected in series and comprise a first set of series-connected DC/DC isolated converters;
   the fourth DC/DC isolated converter, the fifth DC/DC isolated converter, and the sixth DC/DC isolated converter are connected in series and comprise a second set of series-connected DC/DC isolated converters;

the first set of series-connected DC/DC isolated converters and the second set of series-connected DC/DC isolated converters are connected in parallel and supply power to the DC bus;
the DC bus is configured to receive electric power from the first DC/DC isolated converter; and
the first power source comprises at least one of a first solar array, a first battery, and a first supercapacitor, and the second power source comprises at least one of a second solar array, a second battery, and a second supercapacitor.

2. The electrical power system of claim 1, wherein the DC bus is configured to receive electric power from the second DC/DC isolated converter,
the first DC/DC isolated converter and the second DC/DC isolated converter connected in series.

3. The electrical power system of claim 1, further comprising:
a power distribution unit (PDU) configured to receive electric power from the DC bus,
wherein the multi-channel DC bus, the power management system, and the PDU are connected in series, and
the DC bus is configured to supply electric power to the load via the PDU.

4. The electrical power system of claim 1, wherein the DC bus comprises one of a high voltage direct current (HVDC) bus, the load comprising a high voltage load, or a low voltage direct current (LVDC) bus, the load comprising a low voltage load.

5. The electrical power system of claim 1, wherein the DC bus comprises an unregulated DC bus, the DC bus configured to supply power to a thruster.

6. The electrical power system of claim 1, further comprising:
a cascaded H-bridge inverter; and
a power distribution unit (PDU),
wherein the multi-channel DC bus, the cascaded H-bridge inverter, and the PDU are connected in series, the multi-channel DC bus configured to supply electric power to the load via the cascaded H-bridge inverter and the PDU, the load comprising an alternating current (AC) load.

7. An electrical power system comprising:
a first plurality of power sources comprising at least one of a first solar array, a first supercapacitor, and a first battery;
a second plurality of power sources comprising at least one of a second solar array, a second supercapacitor, and a second battery;
a first energy source management converter (ESMC) in electronic communication with the first plurality of power sources;
a second ESMC in electronic communication with the second plurality of power sources;
a multi-channel DC bus;
a cascaded H-bridge inverter; and
a power distribution unit (PDU),
wherein the multi-channel DC bus, the cascaded H-bridge inverter, and the PDU are connected in series, the multi-channel DC bus configured to supply electric power to a load via the cascaded H-bridge inverter and the PDU, the load comprising alternating current (AC) load,
the first ESMC supplies electric power to a first channel of a multi-channel direct current (DC) bus, and
the second ESMC supplies electric power to a second channel of the multi-channel DC bus.

8. The electrical power system of claim 7, further comprising:
a power management system comprising:
a first DC/DC isolated converter configured to receive electric power from the first channel; and
a second DC/DC isolated converter configured to receive electric power from the second channel; and
a DC bus configured to receive electric power from the first DC/DC isolated converter and the second DC/DC isolated converter,
wherein the first DC/DC isolated converter and the second DC/DC isolated converter are connected in series.

9. The electrical power system of claim 8, further comprising:
a power distribution unit (PDU) configured to receive electric power from the DC bus,
wherein the multi-channel DC bus, the power management system, and the PDU are arranged in series, and
the DC bus is configured to supply electric power to the load via the PDU.

10. The electrical power system of claim 9, wherein the DC bus comprises a high voltage direct current (HVDC) bus, the load comprising a high voltage load.

11. The electrical power system of claim 9, wherein the DC bus comprises a low voltage direct current (LVDC) bus, the load comprising a low voltage load.

12. The electrical power system of claim 8, wherein the DC bus comprises an unregulated DC bus, the DC bus configured to supply power to a thruster.

13. The electrical power system of claim 7, wherein the first ESMC comprises an H-bridge coupled between the first solar array and the first channel.

14. A method for supplying electric power to a load comprising:
receiving, by a first channel of a multi-channel direct current (DC) bus, electric power from a first plurality of electric power sources, via a first energy source management converter (ESMC);
receiving, by a second channel of the multi-channel DC bus, electric power from a second plurality of electric power sources, via a second ESMC;
supplying, via the multi-channel DC bus, electric power to a load via a cascaded H-bridge inverter and a power distribution unit (PDU);
wherein the first plurality to power sources comprises at least one of a first solar array, a first supercapacitor, and a first battery;
the second plurality of power sources comprises at least one of a second solar array, a second supercapacitor, and a second battery;
the multi-channel DC bus, the cascaded H-bridge inverter, and the PDU are connected in series; and
the load comprises an alternating current (AC) load.

15. The method of claim 14, further comprising:
receiving, by a first DC/DC isolated converter, electric power from the first channel;
receiving, by a second DC/DC isolated converter, electric power from the second channel;
receiving, by a DC bus, electric power from the first DC/DC isolated converter;
receiving, by the DC bus, electric power from the second DC/DC isolated converter; and
receiving, by the load, electric power from the DC bus,
wherein the first DC/DC isolated converter and the second DC/DC isolated converter are connected in series.

* * * * *